(12) United States Patent
Duppstadt (10) Patent No.: US 6,659,606 B1
(45) Date of Patent: Dec. 9, 2003

(54) ALIGNMENT APPARATUS FOR AN EYEGLASS HINGE ASSEMBLY AND METHOD EMPLOYING SAME

(76) Inventor: Arthur G. Duppstadt, 100 Spring Valley Rd., Leechburg, PA (US) 15656

( * ) Notice: Subject to any disclaimer, the term of this patent is extended or adjusted under 35 U.S.C. 154(b) by 3 days.

(21) Appl. No.: 10/387,033

(22) Filed: Mar. 12, 2003

(51) Int. Cl.⁷ .................................................. G02C 5/22
(52) U.S. Cl. ......................... 351/153; 351/158; 16/228
(58) Field of Search .................................. 351/153, 113, 351/158, 111, 41; 16/228

(56) References Cited

U.S. PATENT DOCUMENTS

| | | |
|---|---|---|
| 3,899,840 A | 8/1975 | Maillet |
| 3,923,384 A | 12/1975 | Leblanc |
| 4,178,116 A | * 12/1979 | Lazarus ..................... 408/108 |
| 4,617,698 A | 10/1986 | Drlik |
| 4,699,479 A | 10/1987 | Metcalfe |
| 4,968,129 A | 11/1990 | Grendol |
| 5,224,248 A | 7/1993 | Brilliant |
| 5,666,181 A | 9/1997 | Conway |
| 5,818,567 A | 10/1998 | Sakai |
| 6,019,467 A | 2/2000 | Kawamoto |
| 6,336,250 B1 | 1/2002 | Takeda et al. |

* cited by examiner

*Primary Examiner*—Hung Kuan Dang
(74) *Attorney, Agent, or Firm*—Grant E. Coffield; Eckert Seamans Cherin & Mellott, LLC (57) ABSTRACT

An alignment apparatus establishes alignment of an eyeglass hinge assembly. The eyeglass hinge assembly includes an attachment member attachable to an eyeglass frame, a first hinge element secured to a temple member, a second hinge element secured to the attachment member, and a hinge spring disposed between the temple member and the first hinge element to permit flexion of the temple member. The hinge spring movably attaches a single, central hinge ring to the temple member. The alignment apparatus secures a temple member in a clamp having opposing first and second clamp elements. Adjustable extending means on a rotating arm secured to the second clamp element extends to engage and displace the single, central hinge ring to deform the hinge spring establishing alignment with a pair of spaced-apart, opposing hinge rings on the second hinge element. An associated method is provided.

27 Claims, 9 Drawing Sheets

ALIGNMENT APPARATUS FOR AN EYEGLASS HINGE ASSEMBLY AND METHOD EMPLOYING SAME

BACKGROUND OF THE INVENTION

1. Field of the Invention

The present invention relates generally to eyeglasses and, more particularly, to an apparatus for establishing alignment of an eyeglass hinge assembly where a temple member pivotally connects to a pair of eyeglasses. The invention also relates to a method for employing the alignment apparatus to facilitate assembly, repair, or adjustment of an eyeglass hinge assembly.

2. Description of the Prior Art

An eyeglass hinge assembly is the pivotal connection between a temple member and an eyeglass frame near the front of a pair of eyeglasses. A temple member is the elongated member that engages the side of an eyeglass wearer's head and the wearer's ear, to hold the eyeglasses in place. Eyeglasses typically have a pair of temple members, one on each side. Each eyeglass hinge assembly typically has several components including hinge elements alternately coupled to and protruding from the temple member and the eyeglass frame. Usually, hinge elements each have at least one hinge ring. Normally, a hinge element secured to a temple member includes a moveable single, central temple hinge ring structured to fit between a pair of stationary, spaced-apart hinge rings located on the hinge element that is attached to the frame. These hinge rings are aligned and a fastener, such as for example, an eyeglass hinge screw, is inserted to pivotally secure the hinge assembly.

Eyeglass hinges are vulnerable to breakage because of their small components. To reduce susceptibility to breakage, springs are commonly added between each temple member and the moveable hinge ring of a pair of eyeglasses to permit hyperextension of the eyeglass hinge (i.e., outward rotation of the temple member with respect to the lens). This allows flexion of a temple member when the temple is under stress, and thereby reduces the frequency of breakage. The hinge springs also improve comfort by reducing inward pressure exerted by a temple member on the side of a wearer's head. However, the hinge spring causes considerable tension on the moveable hinge ring segment of the hinge assembly. This tension makes it very difficult to align the hinge elements as required during initial assembly of an eyeglass hinge, or when attempting to repair, replace or adjust a temple member or other hinge component.

Prior to this invention, most temple members were coupled to the eyeglass frame by simultaneously attempting to line up the hinge rings of the hinge assembly and to force the eyeglass hinge screw into position. This method of lining up the moveable single, central hinge ring with the two stationary spaced-apart, opposing hinge rings has a poor success rate and is often difficult and time consuming. Many times the threads of the screw are ruined by the procedure.

Another somewhat easier methodology was to bolt an assembly to a work bench with a pin protruding upward. The moveable single, central hinge ring was fit down over this pin. With the hinge ring in position over the pin, the temple member was pulled to extend the hinge spring. At this point, the moveable single, central hinge ring was held extended with plastic jawed forceps. This too is often a difficult and time consuming maneuver because the forceps interfere with placement of the fastener into the small hinge ring holes. Additionally, it is difficult to simultaneously hold each component of a spring-loaded eyeglass hinge assembly in alignment because of the torque caused by the weight of the forcep handles while trying to insert a fastener or to replace or adjust a temple member or other hinge component.

There is, therefore, a need for an apparatus and associated method to improve assembly, repair or adjustment of spring-loaded eyeglass hinge assemblies that simplifies the alignment process, reduces the number of tools necessary, and avoids some of the difficulties in the approaches described hereinbefore.

SUMMARY OF THE INVENTION

This need and others are satisfied by the present invention, which is directed to an alignment apparatus for assembling, repairing or adjusting an eyeglass hinge assembly and a method employing the same.

In one embodiment of the invention, an alignment apparatus is used to establish alignment of an eyeglass hinge assembly located between a temple member having a first hinge element and the frame of a pair of eyeglasses. The frame has an attachment member with a second hinge element. The first and second hinge elements are pivotally connected by a fastener. A hinge spring is disposed between the temple member and the first hinge element to permit flexion of the temple member in relation to the frame. The alignment apparatus includes a clamp having opposing first and second clamp elements and a tightening mechanism having open and closed positions. The tightening mechanism is coupled to the second clamp element. The clamp is structured to secure the temple member between the first and second clamp elements when the tightening mechanism is closed. A rotating arm pivotally attached to the first clamp element includes an adjustable extending means. The adjustable extending means is structured to deform the hinge spring of the eyeglass hinge assembly so as to establish alignment thereof.

The hinge spring may be disposed within a cavity inside the temple member.

The first hinge element may include a single, central hinge ring movably attached to the temple member by the hinge spring. The second hinge element may include a pair of spaced-apart, opposing hinge rings. The single, central hinge ring may fit between and align with the pair of spaced-apart, opposing hinge rings. A fastener inserted through the aligned hinge rings may pivotally connect the eyeglass hinge assembly.

In another embodiment of the invention, a method for aligning an eyeglass hinge assembly includes providing a temple member having a first hinge element, an eyeglass frame, and an attachment member having a second hinge element attachable to the frame. A fastener for pivotally connecting the first and second hinge elements, and a hinge spring disposed between the temple member and the first hinge element to permit flexion of the temple member in relation to the frame, are also provided. An alignment apparatus is also provided. The alignment apparatus has a clamp with opposing first and second clamp elements, a rotating arm with an adjustable extending means pivotally coupled to the first clamp element, and a tightening mechanism having open and closed positions disposed on the second clamp element. A temple member is inserted between the first and second clamp elements. The tightening mechanism is tightened until it is in the closed position so as to secure the temple member within the clamp. The adjustable extending means is extended. The hinge spring is deformed by engaging and displacing the first hinge element with the adjustable extending means until the first and second hinge elements are aligned. An operation may then be performed on the eyeglass hinge assembly such as, for example, assembly, repair, adjustment or any combination thereof.

The method may include providing as the first clamp element, an elongated member having a longitudinal groove, aligning the temple member with respect to the longitudinal groove, and closing the tightening mechanism to engage and secure the temple member in the aligned position.

It is an object of the present invention to provide an alignment apparatus to quickly and easily establish alignment of an eyeglass hinge assembly.

It is a further object of the present invention to employ such an apparatus to facilitate assembly, repair or adjustment of an eyeglass hinge assembly.

It is a further object of the invention to employ such an apparatus to insert or replace a fastener in an eyeglass hinge assembly.

It is yet another object of the present invention to employ such an apparatus to assemble, repair or replace an eyeglass hinge assembly component without any alteration to the structure of a pair of eyeglasses or to the method of manufacturing such eyeglasses.

These and other objects of the invention will be fully understood from the following description of the invention with reference to the drawings appended hereto.

DESCRIPTION OF THE PREFERRED EMBODIMENTS

As employed herein, the term "eyeglass" refers to a pair of eyeglasses expressly including, but not limited to, vision-enhancing eyeglasses such as, for example, prescription eyeglasses, bifocals, trifocals, and multi-lens glasses, as well as sunglasses, safety-glasses and eyeglasses without lenses.

As employed herein, the term "frame" refers to frame members which hold two lenses in a relatively fixed position with respect to each other and are structured to be secured to the temple members of a pair of eyeglasses, expressly including, but not limited to, complete frames completely surrounding the lenses, partial frames surrounding a portion of the lenses, and frameless lenses.

As employed herein, "flexion" refers to controlled (e.g., without limitation, by spring resistance) hyperextension of a hinge assembly, for example, outward rotation rather than the normal inward rotation of a temple member in relation to the frame of a pair of eyeglasses.

The invention will be described as applied to alignment of an eyeglass hinge assembly, although it will become apparent that it could also be applied to facilitate a variety of eyeglass operations expressly including, but not limited to, initial assembly of a pair of eyeglasses, eyeglass hinge repair, modification of a pair of eyeglasses, for example interchanging temple members or the frame, and replacement of a temple member, hinge fastener, or other missing or damaged hinge component, or any combination thereof.

Figure 1:
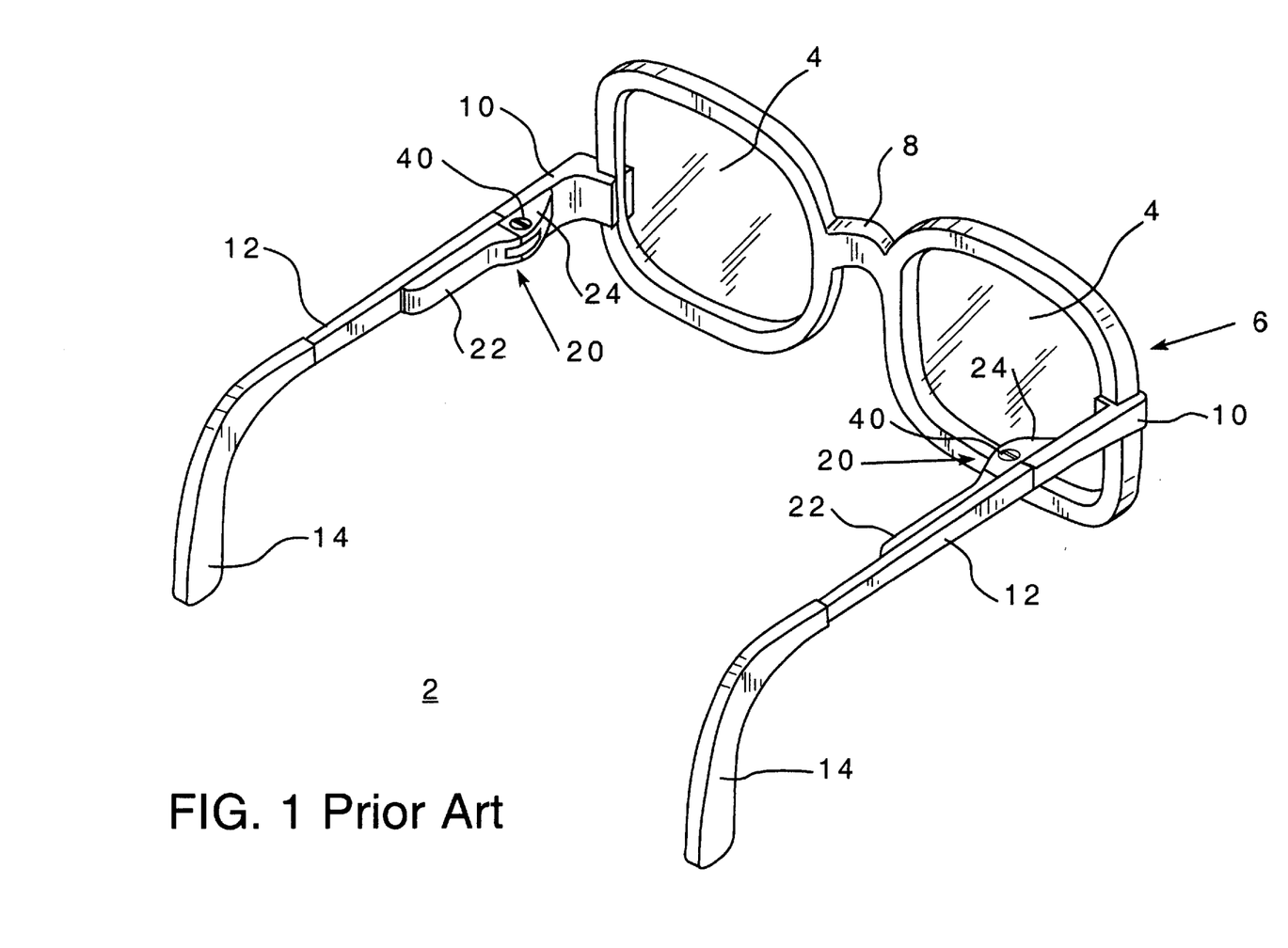
FIG. 1 is an isometric view of a conventional pair of eyeglasses.

FIG. 1, illustrates the basic components of a conventional pair of eyeglasses 2. Each lens 4 is surrounded by a frame 6. A rigid bridge member 8 provides support for the eyeglasses 2 when resting on the bridge of a wearer's nose (not shown). An attachment member 10 is attachable to the frame 6 and pivotally connects to a temple member 12 by way of an eyeglass hinge assembly 20. The eyeglass hinge assembly 20 includes a first hinge element 22 that is secured to the temple member 12. A second hinge element 24 is secured to the attachment member 10. The attachment member 10 is attachable to the frame 6, as shown, or directly to the lens 4 (not shown). The first and second hinge elements 22, 24 are then pivotally connected by a fastener 40. In the exemplary embodiment of FIG. 1, each temple member 12 terminates in a contoured earpiece 14. However, it will be appreciated that each temple member 12 could terminate in alternative ways such as, for example, a straight taper (not shown).

Figure 2:
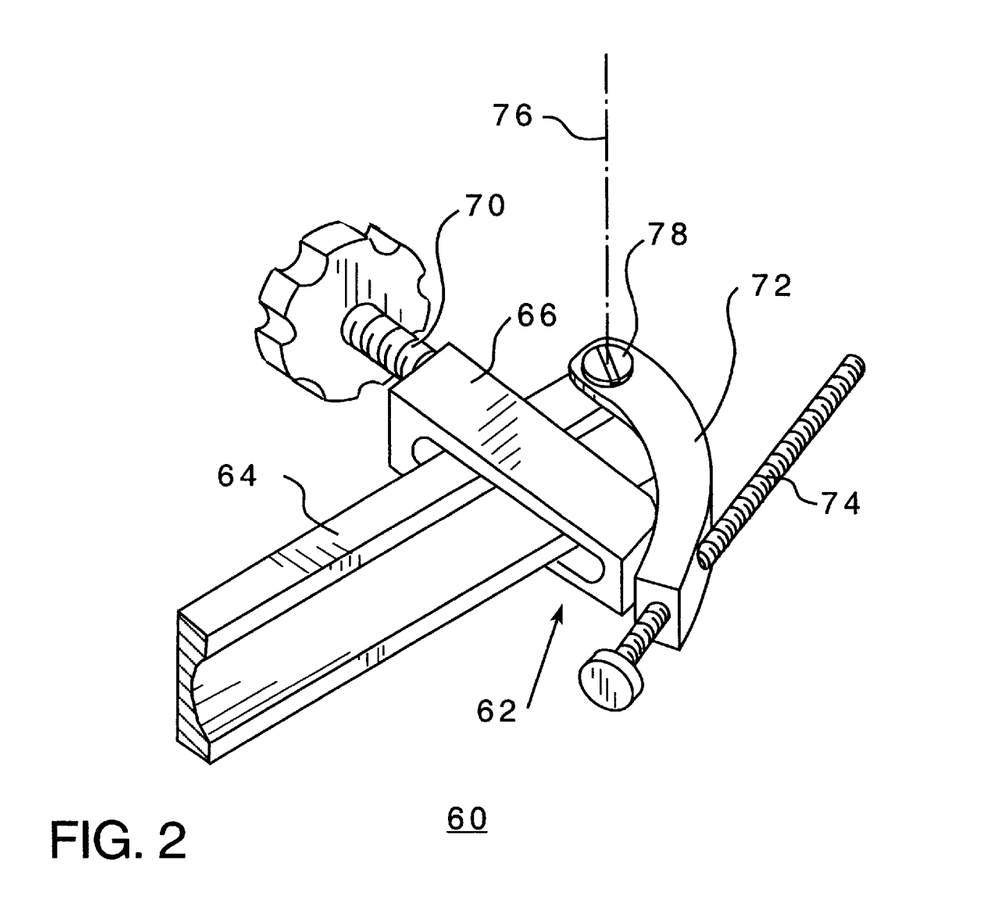
FIG. 2 is an isometric view of an alignment apparatus in accordance with the present invention.
Figure 3:
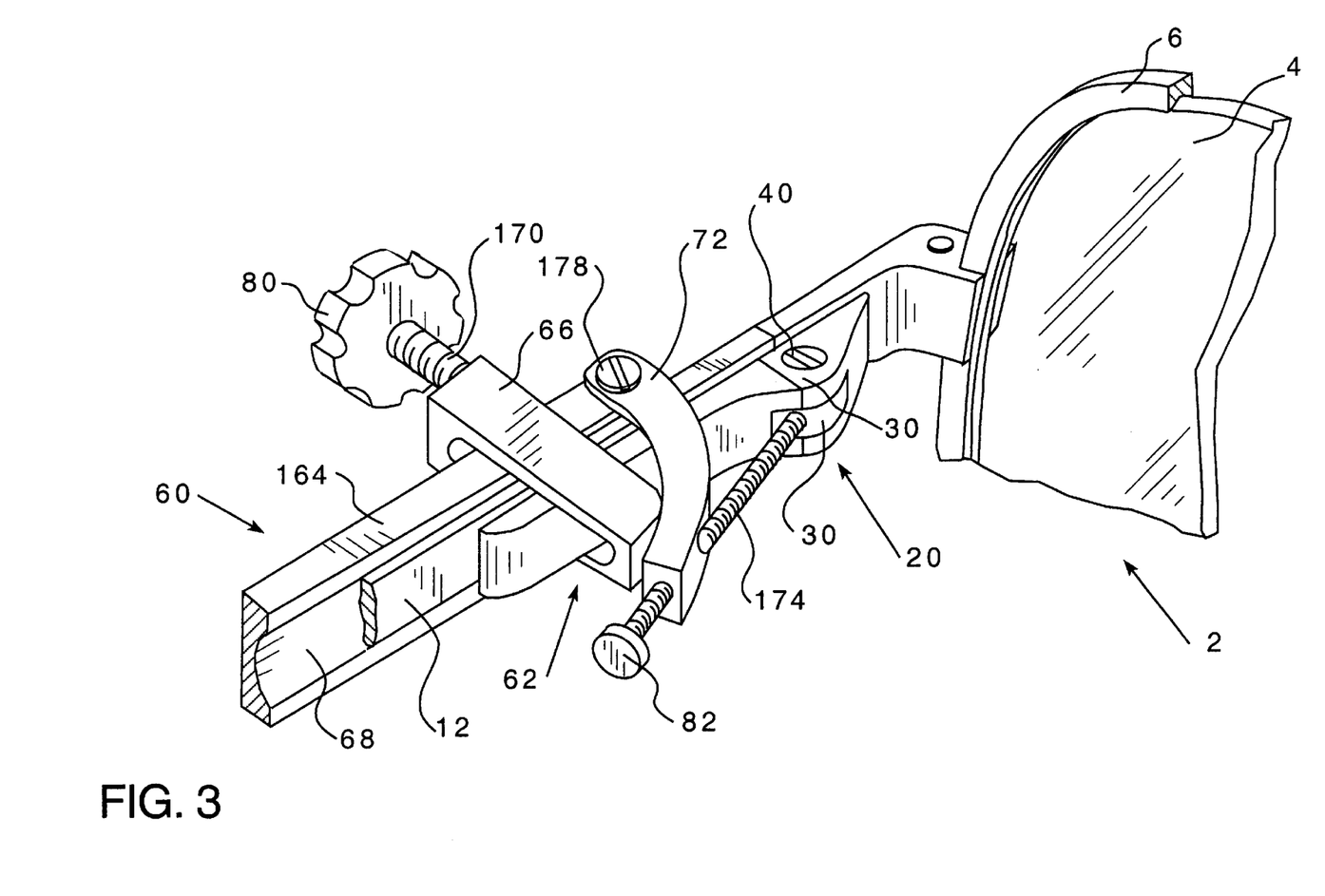
FIG. 3 is an isometric view of the alignment apparatus of FIG. 2 as employed to align an eyeglass hinge assembly.

Referring to FIG. 2, an alignment apparatus 60 used to align an eyeglass hinge assembly 20 (FIG. 1) includes a clamp 62 having opposing first and second clamp elements 64, 66. The exemplary first and second clamp elements 64, 66 of FIG. 2 are translationally coupled to one another. A tightening mechanism 70 having an open position and a closed position is coupled to the second clamp element 66. The open position permits insertion of a temple member 12 between the first and second clamp elements 64, 66 (FIG. 3). In the closed position, the temple member 12 is clamped and secured between the first and second clamp elements 64, 66 (FIG. 3). A rotating arm 72 is pivotally attached to the first clamp element 64 and rotates about a pivot axis 76 on the first clamping element 64. An adjustable extending means 74 is disposed on the rotating arm 72.

FIG. 3 shows the alignment apparatus 60 as employed on a pair of eyeglasses 2. As employed, the clamp 62 is structured to secure a temple member 12 between the first and second clamping elements 64, 66 when the tightening mechanism 70 is closed. As shown, the exemplary first clamp element 64 is an elongated member 164 that includes a longitudinal groove 68 structured to engage and align a temple member 12 therein. The exemplary tightening mechanism 70 is a threaded rod 170 disposed on the second clamp element 66 and structured to secure a temple member 12 within the longitudinal groove 68 of the elongated member 164 when the threaded rod tightening mechanism 170 is turned to the closed position. The exemplary extending means 74 is also an adjustable threaded rod 174. The threaded rod tightening mechanism 170 and adjustable threaded rod extending means 174 each include knobs 80, 82 to facilitate turning by a user to close the threaded rod tightening mechanism 170 and to extend the adjustable threaded rod extending means 174, respectively.

In FIG. 3, the exemplary fastener 78 pivotally coupling the rotating arm 72 to the elongated member 164 is a threaded rod 178. However, alternative fasteners 78 could be used, such as, for example, a pin (not shown). A bushing (not shown) may also be optionally provided to the threaded rod 178 to improve rotation of the rotating arm 72 about the pivot axis 76 (FIG. 2) of the elongated member 164.

Figure 4:
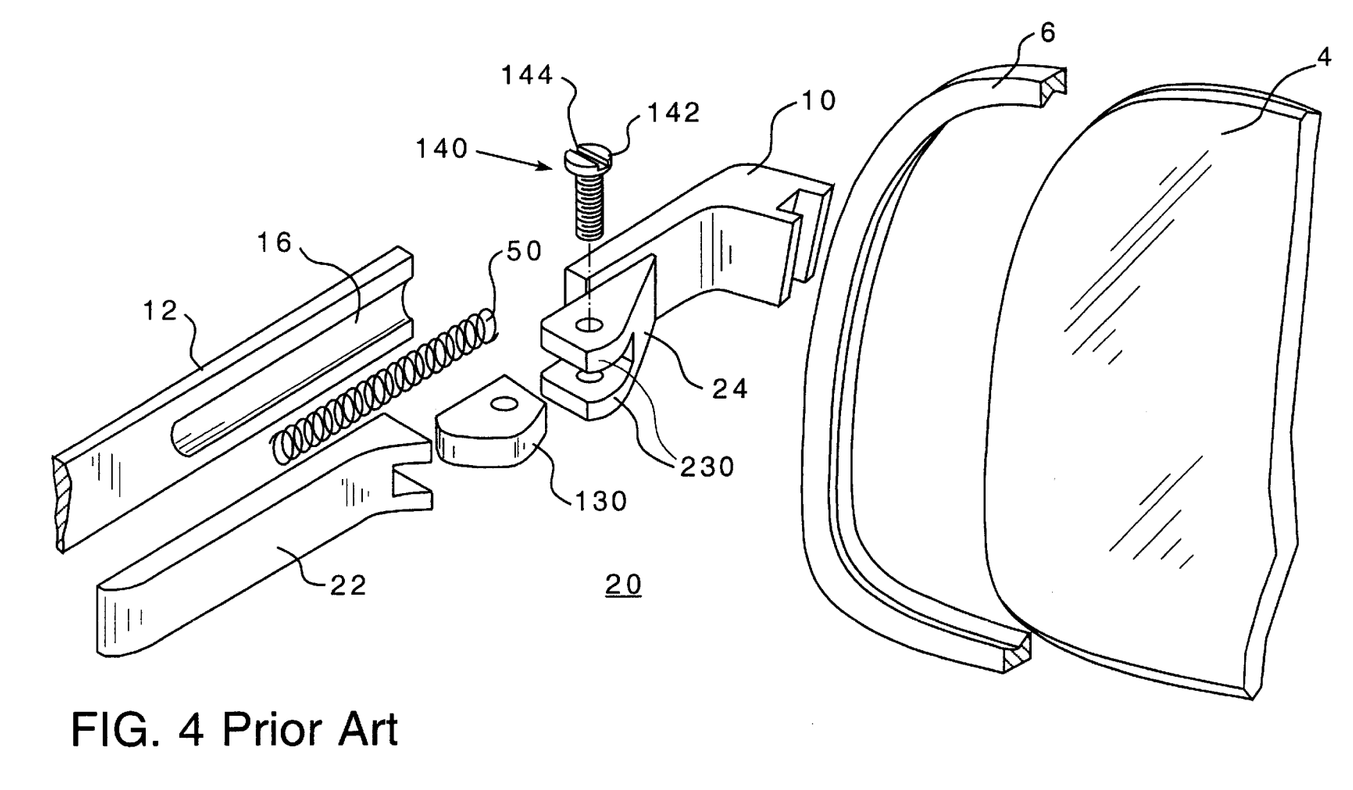
FIG. 4 is an exploded isometric view of an eyeglass hinge assembly of the conventional pair of eyeglasses of FIG. 1.

FIG. 4 illustrates the components of a conventional eyeglass hinge assembly 20 in greater detail. The first and second hinge elements 22, 24 each have at least one hinge ring 30 (FIG. 3). In the exemplary embodiment the first hinge element 22, includes a single, central hinge ring 130 movably attached to the temple member 12 by a hinge spring 50 (best shown in FIG. 5) and the second hinge element 24, has a stationary pair of spaced-apart, opposing hinge rings 230 attachable to attachment member 10. The single, central hinge ring 130 of the first hinge element fits between and aligns with the pair of spaced-apart, opposing hinge rings 230 of the second hinge element 24. A fastener 40, such as for example, the exemplary eyeglass hinge screw 140 shown, is inserted through the aligned hinge rings 130, 230 to pivotally connect the first and second hinge elements 22, 24. The eyeglass hinge screw 140 includes a head 142 with a slot 144. The slot 144 permits an individual to tighten the hinge screw 140 with a tool (not shown) such as, for example, a screwdriver (not shown). One or both of the pair of spaced-apart, opposing hinge rings 230 may be threaded (not shown) to engage the eyeglass hinge screw 140 threads to secure it therein.

It will be appreciated that the pivotal connection of the first and second hinge elements 22, 24 could be accomplished using any type of fastener including, but not limited to, a threaded rod (not shown), a bolt (not shown), or a pin (not shown). Additionally, one skilled in the art will appreciate that any number of hinge rings 130, 230, for example, could be employed in a wide array of configurations (not shown) on any number of hinge elements 22, 24, for example. Additionally, the hinge rings 130, 230, for example, could be different shapes (not shown) or, an alternative method of pivotally connecting a temple member 12 to the frame 6 could eliminate the need for hinge rings 130, 230, for example, altogether, such as, for example, a resilient connecting strip (not shown), or a ball joint (not shown).

The conventional eyeglass hinge assembly 20 shown in FIG. 4, is spring-loaded having a hinge spring 50 disposed within a cavity 16 in the temple member 12. The single, central hinge ring 130 is movably attached to the hinge spring 50 (best shown in FIG. 5), to permit flexion of the temple member 12 in relation to the frame 6. The hinge spring 50 reduces the eyeglass hinge assembly's 20 vulnerability to breakage by allowing flexion of the temple member 12 when the temple member 12 or the eyeglass hinge assembly 20 is under stress. The exemplary hinge spring 50 is a coil spring 150 disposed within a cavity 16 in the temple member 12 and secured to the moveable single, central hinge ring 130 (best illustrated in FIG. 6). However, it will be appreciated that an alternative spring type could be employed expressly including, but not limited to, a leaf spring 250, as shown in FIG. 7.

Figure 5:
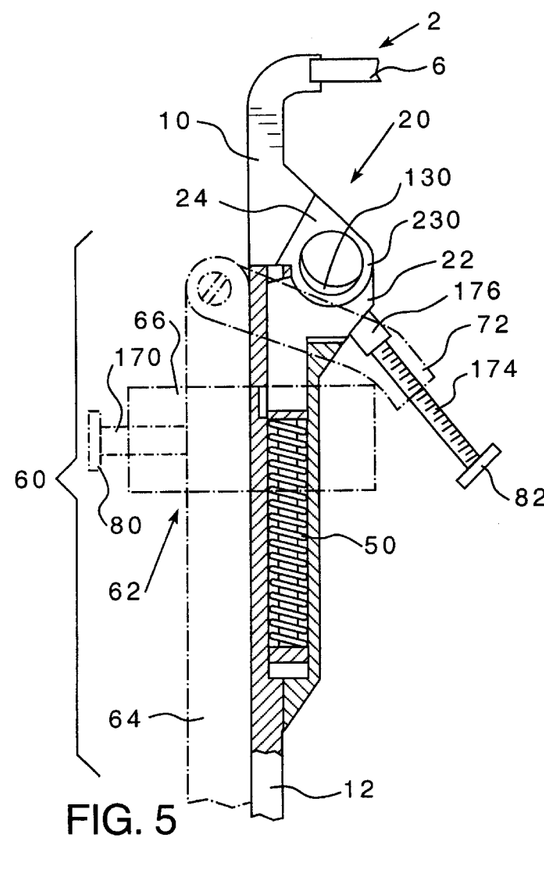
FIG. 5 is a plan view cross-section of a temple member and an eyeglass hinge assembly showing internal structures, and the alignment apparatus of FIG. 2 shown in phantom line drawing.
Figure 6:
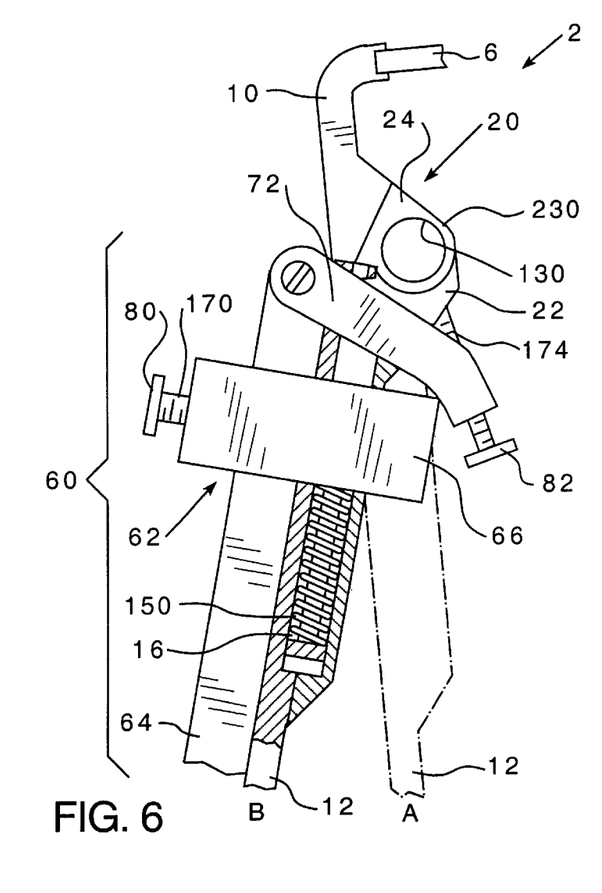
FIG. 6 is a plan view of the cross-section of the temple member and eyeglass hinge assembly of FIG. 5 with the alignment apparatus of FIG. 2 as employed to align the eyeglass hinge assembly. Position A, shown in phantom line drawing, shows the hinge assembly before alignment. Position B shows the assembly after establishing alignment.

Referring to FIGS. 5 and 6, the exemplary adjustable extending means 74 is an adjustable threaded rod 174 disposed on the rotating arm 72 and structured to engage and displace the moveable single, central hinge ring 130 to deform the exemplary coil spring 150 (FIG. 6). The hinge spring 50 (FIG. 5) must be sufficiently deformed to establish alignment between the single, central hinge ring 130 and the pair of spaced-apart, opposing hinge rings 230 (compare unaligned hinge rings 130, 230 of FIG. 5, with aligned hinge rings 130, 230 of FIG. 6, position B). The adjustable threaded rod 174 shown includes a knob 82 to facilitate adjustment by a user (e.g., turning to extend the adjustable threaded rod 174). The adjustable threaded rod 174 may also include a cap 176 to cover the threads on the end of the adjustable threaded rod 174 opposite the knob 82 (FIG. 5). The cap 176 permits the adjustable threaded rod 174 to turn inside the cap 176 while the cap 176 remains stationary in its articulation with the single, central hinge ring 130. The cap 176 may be made from a relatively soft material such as, for example, plastic or rubber to improve engagement and displacement of the single, central hinge ring 130 with the adjustable threaded rod 174, while simultaneously minimizing potential damage to the single, central hinge ring 130 potentially caused by the threads of the adjustable threaded rod 174.

Figure 7:
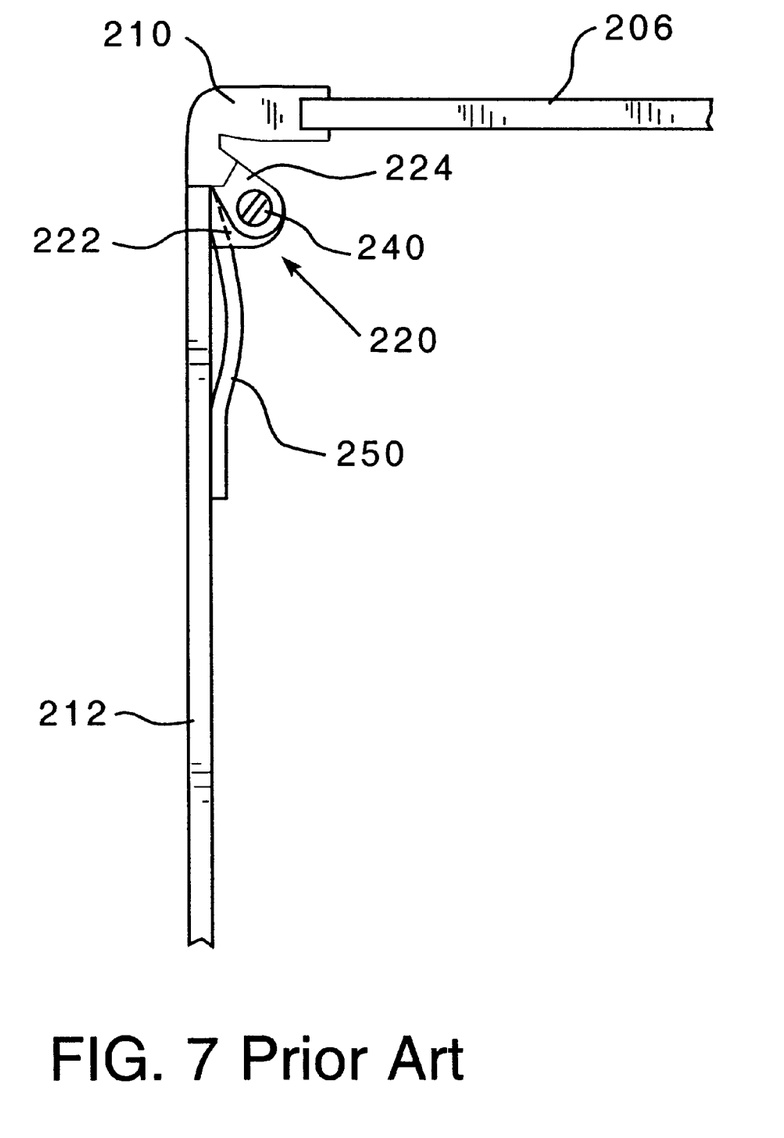
FIG. 7 is a plan view of another conventional embodiment of an eyeglass hinge assembly.

FIG. 7 illustrates another conventional eyeglass hinge assembly 220 in which the hinge spring 50 is a leaf spring 250 attached to the exterior of the temple member 212. The leaf spring 250 permits flexion of the temple member 212 with respect to the frame 206. An attachment member 210 is attachable to the frame 206. The temple member 212 and attachment member 210 include first and second hinge elements 222, 224, respectively, that are pivotally coupled by a fastener 240.

As illustrated, a method for aligning the eyeglass hinge assembly 20 between a temple member 12 and the frame 6 of a pair of eyeglasses 2 includes providing an eyeglass hinge assembly 20 having a first hinge element 22 secured to the temple member 12, an attachment member 10 attachable to a frame 6 and having a second hinge element 24, a fastener 40 for pivotally connecting the first and second hinge elements 22, 24 (FIG. 3), and a hinge spring 50 disposed between the temple member 12 and the first hinge element 22 (FIG. 5) to permit flexion of the temple member 12 in relation to the frame 6 (FIG. 6, position B). An alignment apparatus 60 having a clamp 62 is provided (FIG. 2). The clamp 62 has opposing first and second clamp elements 64, 66. A rotating arm 72 is pivotally coupled to the first clamp element 64 and has adjustable extending means 74 (FIG. 2). The second clamp element 66 has a tightening mechanism 70 with open and closed positions (FIG. 2). A temple member 12 is inserted between the first and second clamp elements 64, 66 (FIG. 3). The tightening mechanism 70 is then tightened until it is closed so as to secure the temple member 12 within the clamp 62. The adjustable extending means 74 is extended. The hinge spring 50 is deformed by engaging and displacing the first hinge element 22 with the adjustable extending means 74 (FIG. 5). The first and second hinge elements 22, 24 are aligned (FIG. 6, position B). Finally, an operation is performed on the eyeglasses 2 such as, for example, assembly, repair, adjustment, replacement, or any combination thereof (not shown).

The disclosed method of establishing alignment using the alignment apparatus 60, preferably, further includes providing an elongated member 164 with a longitudinal groove 68 as the first clamp element 64, aligning the temple member 12 with respect to the longitudinal groove 68, and closing the tightening mechanism 70 to engage and secure the temple member 12 in the aligned position therein (best shown in FIG. 3).

In the exemplary method, illustrated in FIGS. 5 and 6, the tightening mechanism 70 is a threaded rod 170 and the adjustable extending means 74 extending from the rotating arm 72, is an adjustable threaded rod 174. Knobs 80, 82 on the threaded rod tightening mechanism 170 and adjustable threaded rod extending means 174 facilitate user closing and extension, respectively. The exemplary method further includes the steps of turning the tightening mechanism knob 80 to close the threaded rod tightening mechanism 170 thus engaging and securing a temple member 12 against the first clamp element 64, and turning the adjustable extending means knob 82 until the adjustable threaded rod 174 engages and displaces the movable single, central hinge ring 130 thus stretching the attached coil spring 150 sufficiently to establish alignment of the single, central hinge ring 130 with respect to the pair of spaced-apart, opposing hinge rings 230 (FIG. 6, position B).

Referring to FIG. 6, the coil spring 150 must be sufficiently deformed to align the hinge rings 130, 230 to facilitate assembly, repair or adjustment of the eyeglass hinge assembly 20. In the exemplary embodiment of FIG. 6, the coil spring 150 must be stretched to establish alignment. Alternatively, if the hinge spring 50 was a leaf spring 250, as shown in FIG. 7, the leaf spring 250 would have to be flexed rather than stretched, to accomplish such alignment (not shown).

FIG. 6, position A, illustrates the exemplary alignment apparatus 60 as employed immediately prior to engaging the exemplary single, central hinge ring 130 of the first hinge element 22 and extending the exemplary coil spring 150. FIG. 6, position B shows the exemplary alignment apparatus 60 as employed after securing a temple member 12 using the clamp 62, and aligning the moveable single, central hinge ring 130 between the pair of spaced-apart, opposing hinge rings 230. The threaded rod tightening mechanism 170 is in the closed position, indicating that the temple member 12 is secured and aligned. The adjustable threaded rod 174 is in the extended position, indicating that the coil spring 150 is sufficiently stretched to align the hinge rings 130, 230. Once alignment is established (FIG. 6, position B), the user can quickly and easily perform a wide array of operations to the eyeglass hinge assembly 20, expressly including but not limited to, initial assembly, insertion or replacement of a fastener 40 (see for example, the eyeglass hinge screw 140 of FIG. 4), repair or replacement of one or more hinge components, adjustment of one or more hinge component or combinations thereof (not shown).

Figure 8:
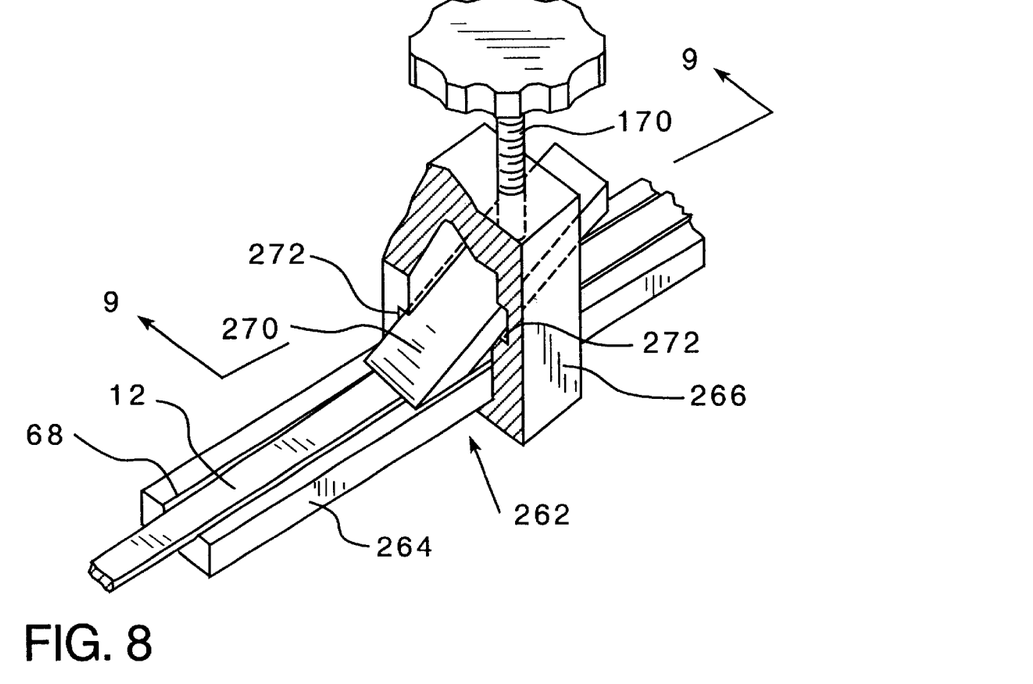
FIG. 8 is an isometric view of a clamp of an alignment apparatus with portions of the second clamp element cut away to show internal structures in accordance with another embodiment of the invention.
Figure 10:
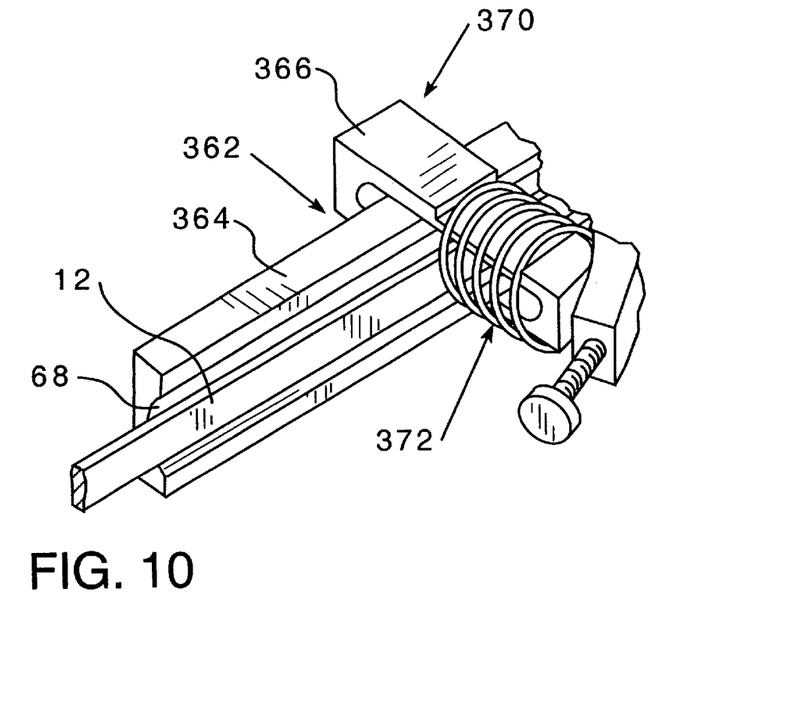
FIG. 10 is an isometric view of a clamp of an alignment apparatus in accordance with another embodiment of the invention.
Figure 11:
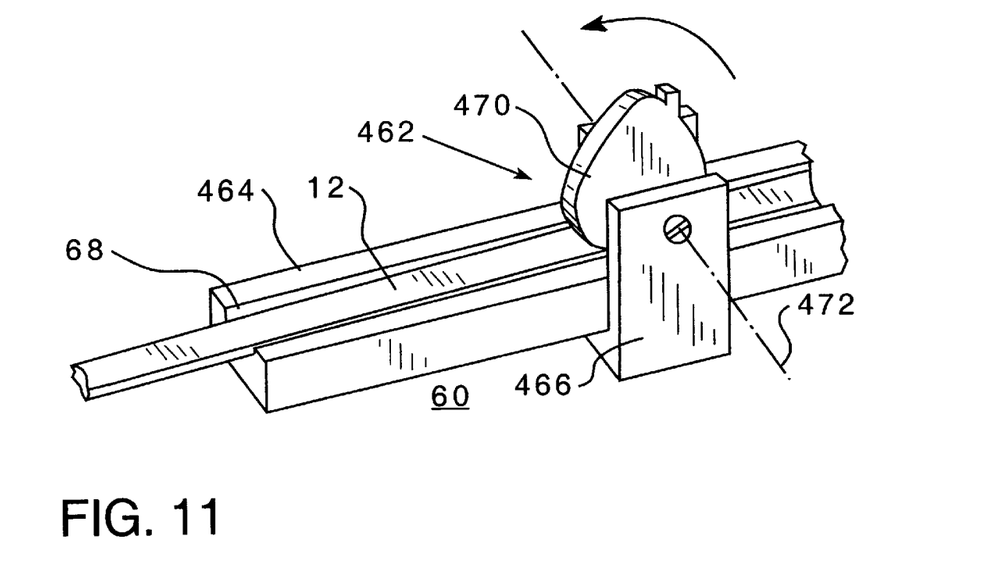
FIG. 11 is an isometric view of a clamp of an alignment apparatus in accordance with another embodiment of the invention.

It will be appreciated that an alternative clamp 62 and tightening mechanism 70 could be employed, such as, for example, a wedge 270 (FIGS. 8 and 9), a spring-loaded element 370 (FIG. 10), or an ecocentric cam 470 (FIG. 11). As shown in FIG. 8, it will be appreciated that an alternative embodiment of the clamp 262 may include a wedge 270 engaged with a guiding slot 272 for relative movement with respect thereto. The second clamp element 266 may include a guiding slot 272 on both sides of the wedge 270 that is substantially parallel to direction the wedge 270 travels therein. The wedge 270 could be structured to slide within the guiding slot 272 when the threaded rod tightening mechanism 170 is tightened so that the free end of the tightening mechanism 170 engages the wedge 270 causing the wedge 270 to slide downward within the guiding slot 272 toward the temple member 12 to secure the temple member 12 against the first clamp element 264 within the longitudinal groove 68 therein. A stop (not shown) could be included to prevent the wedge 270 from coming out of the guiding slot 272 when the threaded rod tightening mechanism 170 is in the open position.

Figure 9:
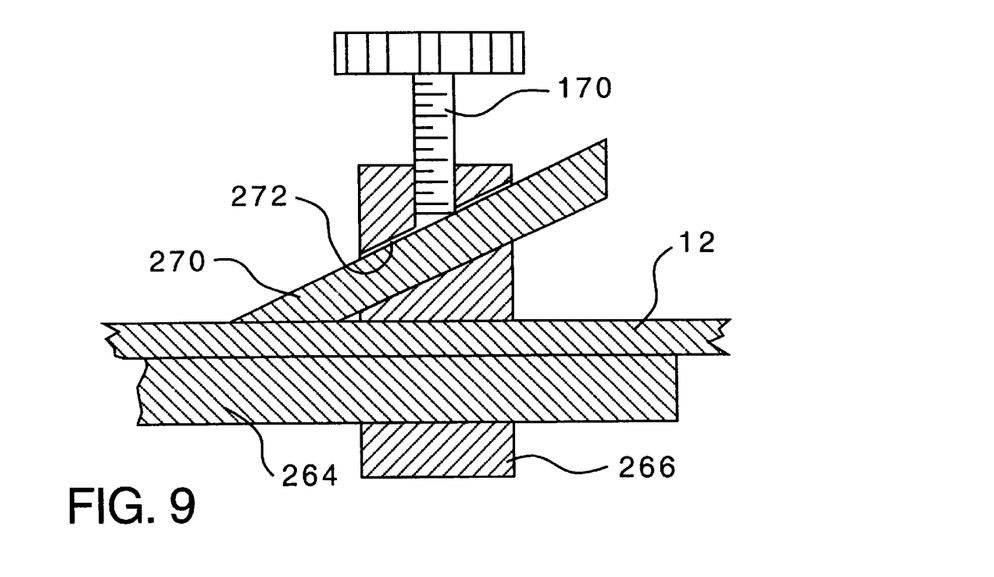
FIG. 9 a sectional view taken along lines 9—9 of FIG. 8.

As shown in sectional FIG. 9, the wedge 270 may have a substantially rectangular cross-section and engage a guiding slot 272 in the second clamp element 266 for relative movement with respect thereto. The guiding slot 272 may be substantially parallel to the wedge 270 and angled with respect to the second clamp element 266 to facilitate downward movement of the wedge 270. When the threaded rod tightening mechanism 170 is closed, as shown, the free end of the tightening mechanism 170 engages the wedge 270 as shown causing it to slide downward, securing the temple member 12 against the first clamp element 264.

Another clamp 362 alternative may include a spring-loaded element 370 as shown in FIG. 10. As shown, the spring-loaded element 370 could comprise a coil spring 372 disposed on the second clamp element 366 and structured to compress a temple member 12 against the first clamp element 364 securing it within the longitudinal groove 68 therein.

Alternatively, as shown in FIG. 11, the clamp 462 may include an ecocentric cam 470 pivotally attached to the second clamp element 466 to secure a temple member 12 against the first clamp element 464. An ecocentric cam 470 is one that has a non-circular, typically oblong, shape. When the ecocentric cam 470 is rotated about a pivotal axis 472 the non-circular shape provides an increasing clamping force. In this fashion, an ecocentric cam 470 could be used to secure a temple member 12 within-the longitudinal groove 68 of the first clamp element 464 of the alignment apparatus 60, when the ecocentric cam 470 is rotated about the pivotal axis 472 to a closed, clamped position (not shown).

Figure 12:
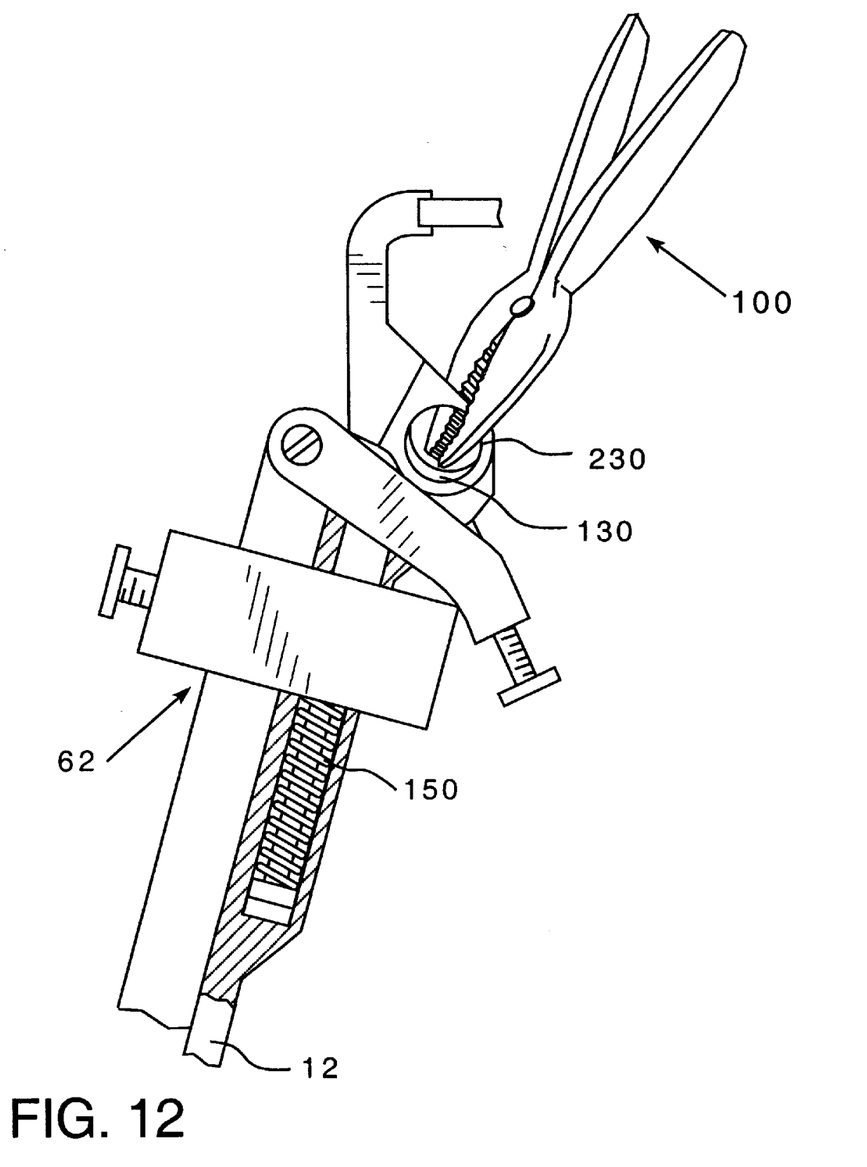
FIG. 12 is a plan view of the cross-section of FIG. 5 and a tool assembly in accordance with another embodiment of the invention.

It will also be appreciated that hinge rings 130, 230, for example, come in various sizes and shapes (not shown). Accordingly, if the adjustable threaded rod 174 cannot sufficiently engage a particular movable hinge ring 130, for example, to displace it and deform the hinge spring 150, for example, an additional step may be required to displace the hinge ring 130 while the temple member 12 is secured in the clamp 62. As shown in FIG. 12, a tool assembly 100 may be used to displace the movable single, central hinge ring 130 before extending the adjustable threaded rod 174. The adjustable threaded rod 174 can then be extended to engage the movable single, central hinge ring 130 and hold the hinge spring 150, for example, in the deformed position. A tool assembly 100 expressly includes, but is not limited to, a pair of needle nose pliers (as shown in FIG. 12), forceps (not shown), a screwdriver (not shown) or other tool assembly 100 suitably structured to engage and displace a moveable hinge ring 130, for example, (not shown).

Accordingly, the disclosed simplistic and readily employable alignment apparatus 60 quickly, easily, and economically establishes alignment of an eyeglass hinge assembly 20 of a pair of eyeglasses 2 to facilitate eyeglass assembly, repair, adjustment, replacement or any combination thereof.

It will be appreciated that the various components of the alignment apparatus 60 such as, for example, first and second clamping elements 64, 66, may be various lengths, sizes and shapes (not shown), other than the rectangular elongated member 164 and shorter, wider, and thicker rectangular second clamp element 66 (best shown in FIG. 3).

The alignment apparatus 60 may also be made from a wide variety of materials such as, for example, metal or plastic. Additionally, the alignment apparatus 60 may be made using a wide array of manufacturing processes such as, for example, machining, forming, molding or casting. Furthermore, while the exemplary alignment apparatus 60 is comprised of three components made from the same material, the alignment apparatus 60 may be constructed from a fewer or greater number of components and from more than one material (not shown).

It will also be appreciated that the disclosed method of alignment may be employed to perform operations on a pair of eyeglasses 2 expressly including, but not limited to, initial assembly, repair, replacement or adjustment of one or more components of an eyeglass hinge assembly 20.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An aligning apparatus for establishing alignment of an eyeglass hinge assembly located between a temple member having a first hinge element and a frame of a pair of eyeglasses, said frame having an attachment member with a second hinge element, said eyeglass hinge assembly including a fastener for pivotally connecting said first and second hinge elements and a hinge spring disposed between said temple member and said first hinge element to permit flexion of said temple member in relation to said frame, said alignment apparatus comprising:

a clamp having opposing first and second clamp elements and a tightening mechanism having open and closed positions, said tightening mechanism secured to said second clamp element;

said clamp being structured to secure said temple member between said first and second clamp elements when said tightening mechanism is closed;

a rotating arm pivotally attached to said first clamp element by a fastener;

an adjustable extending means disposed on said rotating arm; and said adjustable extending means being structured to deform said hinge spring to establish alignment of said eyeglass hinge assembly.

2. The alignment apparatus of claim 1 wherein said opposing first and second clamp elements are translationally coupled.

3. The alignment apparatus of claim 1 wherein said first clamp element is an elongated member.

4. The alignment apparatus of claim 3 wherein said first clamp element includes a longitudinal groove to engage and align said temple member with respect to said longitudinal groove.

5. The alignment apparatus of claim 1 wherein said tightening mechanism is a threaded rod.

6. The alignment apparatus of claim 5 wherein said threaded rod tightening mechanism includes a knob structured for turning by a user.

7. The alignment apparatus of claim 6 wherein said clamp further includes a wedge; wherein said second clamp element includes a guiding slot, said wedge being moveably engaged with said guiding slot for relative movement with respect thereto; and wherein said wedge is structured to securely engage said temple member between said wedge and said first clamp element when said knob is turned to close said threaded rod tightening mechanism.

8. The alignment apparatus of claim 1 wherein said clamp includes a spring-loaded element, said spring-loaded element including a spring disposed on said second clamp element and structured to secure said temple member against said first clamp element by compressing said temple member against said first clamp element.

9. The alignment apparatus of claim 1 wherein said clamp includes an ecocentric cam pivotally secured to said second clamp element, said ecocentric cam being structured to clamp said temple member against said first clamp element when said ecocentric cam is rotated about a pivotal axis on said second clamp element, to the closed position.

10. The alignment apparatus of claim 1 wherein said adjustable extending means is an adjustable threaded rod extending from said rotating arm.

11. The alignment apparatus of claim 10 wherein said adjustable threaded rod includes a knob structured for turning by a user.

12. The alignment apparatus of claim 9 wherein said adjustable threaded rod includes a cap structured to cover the end of said adjustable threaded rod opposite said knob.

13. The alignment apparatus of claim 1 wherein said hinge spring is a coil spring; wherein said temple member forms a cavity therein; and wherein said coil spring is disposed within said cavity.

14. An alignment apparatus of claim 1 wherein said hinge spring is a leaf spring disposed external said temple member.

15. The alignment apparatus of claim 1 wherein each of said first and second hinge elements has at least one hinge ring.

16. The alignment apparatus of claim 15 wherein said at least one hinge ring of said first element is a single, central hinge ring movably attached to said temple member by said hinge spring; wherein said at least one hinge ring of said second hinge element is a pair of spaced-apart, opposing hinge rings; and wherein said single, central hinge ring of said first hinge element fits between and aligns with said pair of spaced-apart, opposing hinge rings of said second hinge element.

17. The alignment apparatus of claim 16 wherein said fastener for pivotally connecting said first and second hinge elements is structured for fastening insertion through said aligned single, central temple hinge ring of said first hinge element and said pair of spaced-apart, opposing hinge rings of said second hinge element.

18. The alignment apparatus of claim 1 wherein said fastener is a threaded eyeglass hinge screw having a head with a slot.

19. The alignment apparatus of claim 1 wherein said first clamp element further includes a pivot axis; and wherein said rotating arm rotates about said pivot axis with respect to said first clamp element.

20. The alignment apparatus of claim 1 wherein said fastener pivotally attaching said rotating arm to said first clamp element is a threaded rod.

21. A method for aligning an eyeglass hinge assembly comprising:

providing a temple member having a first hinge element, an eyeglass frame, an attachment member attachable to said frame, said attachment member having a second hinge element, a fastener for pivotally connecting said first and second hinge elements, and a hinge spring disposed between said temple member and said first hinge element to permit flexion of said temple member in relation to said frame;

providing an alignment apparatus, said alignment apparatus having a clamp with opposing first and second clamp elements, a rotating arm with an adjustable extending means pivotally coupled to said first clamp element, and a tightening mechanism having open and closed positions disposed on said second clamp element;

inserting said temple member between said first and second clamp elements of said clamp;

tightening said tightening mechanism until it is in the closed position so as to secure said temple member within said clamp;

extending said adjustable extending means;

deforming said hinge spring by engaging and displacing said first hinge element with said adjustable extending means;

aligning said first and second hinge elements; and performing an operation on said eyeglass hinge assembly selected from the group consisting of assembly, repair, and adjustment.

22. The method of claim 21 further comprising:

providing as said first clamp element, an elongated member;

providing a longitudinal groove in said elongated member;

aligning said temple member with respect to said longitudinal groove in said elongated member; and closing said tightening mechanism to engage and secure said temple member in the aligned position.

23. The method of claim 22 further comprising:

providing as said tightening mechanism a threaded rod having a knob for turning by a user;

providing as said adjustable extending means an adjustable threaded rod extending from said rotating arm, said adjustable threaded rod having a knob for turning by a user;

turning said knob of said tightening mechanism until said tightening mechanism is closed; and turning said knob of said adjustable extending means to extend said adjustable threaded rod.

24. The method of claim 21 further comprising:

providing as said hinge spring a coil spring; and stretching said coil spring sufficiently to align said first and second hinge elements, by engaging and displacing said first hinge element with said adjustable extending means.

25. The method of claim 21 further comprising:

providing as said hinge spring a leaf spring; and flexing said leaf spring sufficiently to align said first and second hinge elements, by engaging and displacing said first hinge element with said adjustable extending means.

26. The method of claim 21 further comprising:

providing a tool assembly for engaging said first hinge element;

employing said tool assembly to engage and displaced said first hinge element thus deforming said hinge spring before extending said adjustable extending means; and extending said adjustable extending means to engage and hold said first hinge element in the displaced position with said hinge spring sufficiently deformed to align said first and second hinge elements.

27. The method of claim 21 further comprising:

providing a first hinge element including a single, central hinge ring movably attached to said temple member by said hinge spring;

providing a second hinge element including a pair of spaced-apart, opposing hinge rings;

engaging and displacing said single, central hinge ring to deform said hinge spring;

aligning said single, central hinge ring between said pair of spaced-apart, opposing hinge rings; and employing said adjustable extending means to maintain alignment of said single, central hinge ring between said pair of spaced-apart, opposing hinge rings.

* * * * *

UNITED STATES PATENT AND TRADEMARK OFFICE
CERTIFICATE OF CORRECTION

PATENT NO. : 6,659,606 B1
DATED : December 9, 2003
INVENTOR(S) : Arthur G. Duppstadt

It is certified that error appears in the above-identified patent and that said Letters Patent is hereby corrected as shown below:

<u>Title page,</u>
*Primary Examiner*, "Hung Kuan Dang" should read -- Hung Xuan Dang --.

<u>Column 12,</u>
Line 20, "displaced" should read -- displace --.

Signed and Sealed this

Twentieth Day of April, 2004

JON W. DUDAS
*Acting Director of the United States Patent and Trademark Office*